(12) United States Patent
Lee et al.

(10) Patent No.: US 7,824,816 B2
(45) Date of Patent: Nov. 2, 2010

(54) FUEL CELL SYSTEM

(75) Inventors: Jae-yong Lee, Yongin-si (KR);
Kyoung-hwan Choi, Yongin-si (KR)

(73) Assignee: Samsung SDI Co., Ltd., Suwon-si, Gyeonggi-do (KR)

(*) Notice: Subject to any disclaimer, the term of this patent is extended or adjusted under 35 U.S.C. 154(b) by 118 days.

(21) Appl. No.: 11/964,485

(22) Filed: Dec. 26, 2007

(65) Prior Publication Data

US 2008/0160389 A1 Jul. 3, 2008

(30) Foreign Application Priority Data

Dec. 27, 2006 (KR) .................... 10-2006-0135007

(51) Int. Cl.
*H01M 8/02* (2006.01)

(52) U.S. Cl. .............. 429/456; 429/544; 429/545; 429/467; 429/469; 429/507; 429/508

(58) Field of Classification Search .............. 429/13, 429/30, 33, 34, 38, 40, 35, 37, 39; H01M 8/02, H01M 8/04, 8/10
See application file for complete search history.

(56) References Cited

U.S. PATENT DOCUMENTS

| 5,756,874 A * | 5/1998 | Steward .................... 588/302 |
| 6,447,941 B1 * | 9/2002 | Tomimatsu et al. ........... 429/26 |
| 2005/0196666 A1 * | 9/2005 | Gottesfeld et al. .......... 429/127 |
| 2005/0255364 A1 * | 11/2005 | Cho et al. .................... 429/38 |

* cited by examiner

*Primary Examiner*—Jennifer K Michener
*Assistant Examiner*—Heng M Chan
(74) *Attorney, Agent, or Firm*—Lee & Morse, P.C.

(57) ABSTRACT

Provided is a fuel cell system including: a fuel cell unit; a fuel cartridge; and a fuel actuator that is disposed between the fuel cartridge and the fuel cell unit, to control the fuel supply from the fuel cartridge to the fuel cell unit. The fuel cell unit comprises: a stack including unit cells oriented in parallel to one another; a phase change layer disposed adjacent to the stack and having a length perpendicular to the parallel orientation of the unit cells; a fuel diffusion layer disposed on the phase change layer.

25 Claims, 5 Drawing Sheets

FUEL CELL SYSTEM

CROSS-REFERENCE TO RELATED APPLICATION

This application claims the benefit of Korean Application No. 2006-135007, filed Dec. 27, 2006, in the Korean Intellectual Property Office, the disclosure of which is incorporated herein by reference.

BACKGROUND OF THE INVENTION

1. Field of the Invention

Aspects of the present invention relate to a fuel cell system.

2. Description of the Related Art

Fuel cells have received much attention as one of the next generation, battery-like, energy sources. Fuel cells are high efficiency electricity generation devices and can be used to replace primary cells and/or secondary cells, as power sources for mobile electronic products, such as, mobile phones and notebook computers. Fuel cell systems include one or more fuel cells operated in conjunction with other elements of the fuel cell system. Although the fuel cell is a core component of the fuel cell system, the fuel cell does not operate by itself. The phrase "a fuel cell is mounted on an electronic product" denotes that a fuel cell system is mounted in the electronic product.

FIG. 1 is a schematic diagram showing a configuration of a conventional fuel cell system. Referring to FIG. 1, the conventional fuel cell system includes a cartridge 10, a fuel cell unit 12, a water tank (recycler) 14 that is a vapor/liquid separator, a heat exchanger 16, a heat dissipation fan 18, an air pump 20, a fuel pump 22, a feed pump 24, a circuit unit 26, and an auxiliary power source 28. Methanol, which is a fuel that is supplied to the fuel cell unit 12, is stored in the cartridge 10. Electricity is generated by an electrochemical reaction in the fuel cell unit 12, between the fuel supplied from the cartridge 10, and air (oxygen) supplied by the air pump 20. Water is supplied from the recycler 14 to dilute the fuel. In the electrochemical reaction, carbon dioxide and water are produced.

High temperature steam, generated during operation of the fuel cell unit 12, is cooled in the heat exchanger 16 and stored in the recycler 14, after the vapor and the liquid are separated. When the high temperature steam is cooled in the heat exchanger 16, heat from the steam is transferred to the heat exchanger 16. Heat transferred to the heat exchanger 16 is discharged to the outside by the heat dissipation fan 18. The air pump 20 supplies air (oxygen) to the fuel cell unit 12, during operation of the fuel cell unit 12. The fuel pump 22 supplies fuel from the cartridge 10 to a feed pump 24, when the fuel cell unit 12 starts. The feed pump 24 circulates diluted fuel in the fuel cell system and supplies the diluted fuel to the fuel cell unit 12. The circuit unit 26 controls all elements described above, except for the heat exchanger 16. The auxiliary power source 28 supplies power required for operating the circuit unit 26, the heat dissipation fan 18, the fuel pump 22, the feed pump 24, and the air pump 20, until a sufficient amount of power is output from the fuel cell system.

As described above, the conventional fuel cell system requires a facility for storing a large amount of liquid (water), to dilute the fuel to a low concentration, and also requires a pump besides the heat exchanger 16 or the recycler 14, to reuse water produced during the operation of the fuel cell unit 12. Therefore, the conventional fuel cell system has a large volume.

In the conventional fuel cell system, power must be supplied for the operation of the fuel pump 22, the feed pump 24, and the heat dissipation fan 18. Therefore, these components increase the overall power consumption of the conventional fuel cell system. Also, noise caused by the operation of the various pumps 20, 22, and 24, is considerable.

In the conventional fuel cell system, a relative location of the recycler (water tank) 14 with respect to the fuel cell unit 12, is specified. Therefore, if the location of the recycler 14 with respect to the fuel cell unit 12 is not properly maintained, it is difficult to supply water from the recycler 14 to the fuel cell unit 12.

SUMMARY OF THE INVENTION

Aspects of the present invention provide a fuel cell system that has a small volume, reduced power consumption, reduced noise, and can supply an adequate amount of fuel to a fuel cell unit, regardless of the location of the fuel cell unit.

According to aspects of the present invention, there is provided a fuel cell system including a fuel cartridge, a fuel cell unit, and a fuel actuator that is disposed between the fuel cartridge and the fuel cell unit. The fuel actuator controls an amount of the fuel supplied from the fuel cartridge to the fuel cell unit. The fuel cell unit comprises a fuel diffusion layer, a phase change layer located on the fuel diffusion layer, to change a phase of the fuel, and a stack that comprises a plurality of unit cells arranged in a perpendicular direction to an upper surface of the phase change layer. The fuel diffusion layer may be a porous material layer, a wick plate, or a wick layer.

According to aspects of the present invention, the unit cells may comprise an MEA (membrane electrode assembly), first and second plates that face each other with the MEA disposed therebetween. The first and second plates are separated from the MEA. The unit cells can comprise a first cap covering an end of the MEA and an end of the first plate adjacent to the end of the MEA, and a second cap covering an opposing end of the MEA and an end of the second plate. The first cap may comprise a hole.

According to aspects of the present invention, the fuel cell units may comprise a plurality of spacers to maintain gaps between the first and second plates and the MEA. The spacers may be protrusions formed towards the MEA, on the first and second plates.

According to aspects of the present invention, the fuel cell unit may further comprise a fan disposed adjacent to one side of the stack. The fuel actuator may be a valve and/or a pump.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
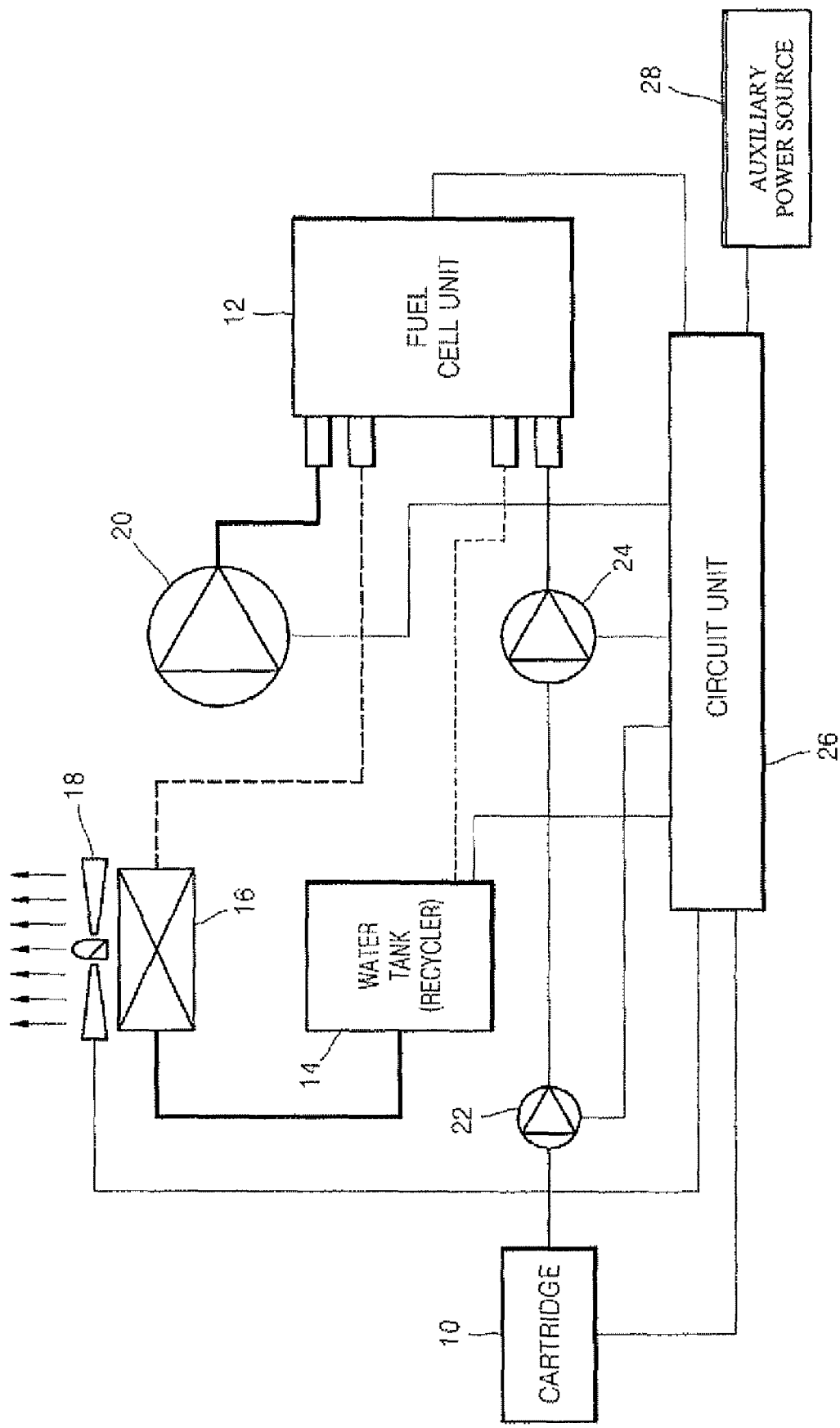
FIG. 1 is a schematic diagram showing a configuration of a conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
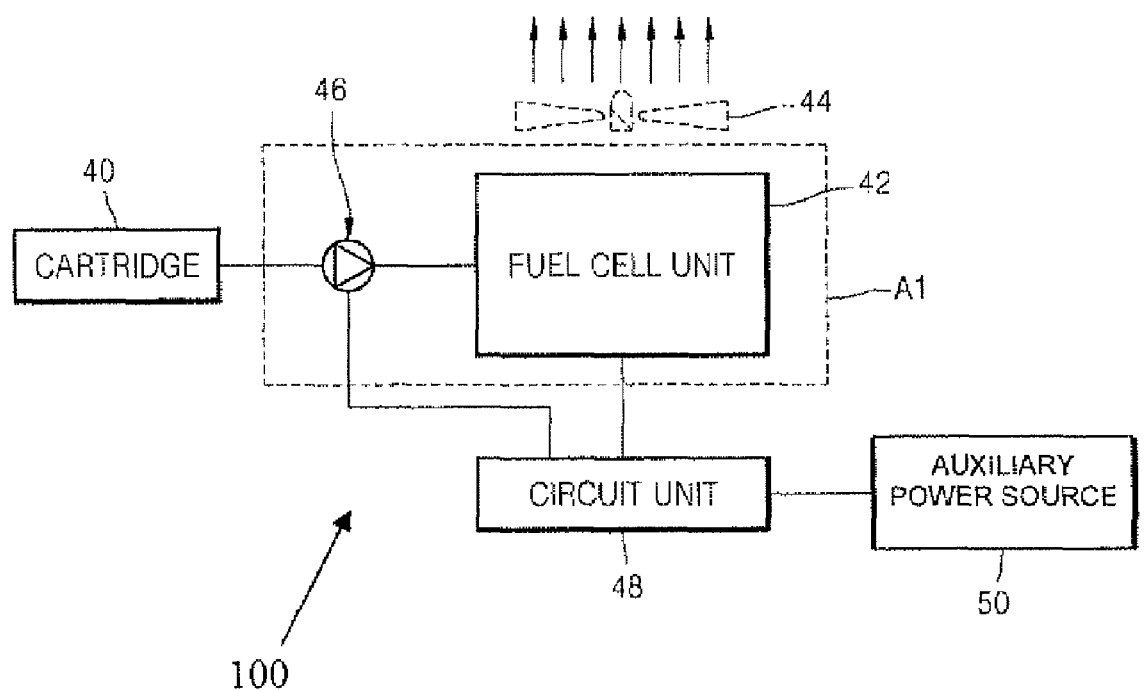
FIG. 2 is a schematic diagram showing a configuration of a fuel cell system, according to an exemplary embodiment of the present invention.

Referring to FIG. 2, the fuel cell system 100, according to aspects of the present invention, includes: a cartridge 40 to store a fuel; a fuel cell unit 42 including a plurality of unit cells (not shown); a fuel actuator 46 provided between the cartridge 40 and the fuel cell unit 42; a fan 44 provided in front of the fuel cell unit 42; a circuit unit 48; and an auxiliary power source 50. The fuel cell unit 42, the fuel actuator 46, the fan 44, the circuit unit 48, and the auxiliary power source 50 may comprise a power unit. The cartridge 40 may include fuel that includes hydrogen, which can be vaporized in the fuel cell unit 42. For example, the fuel stored in the cartridge 40 may be methanol, ethanol, or formic acid. The fuel actuator 46 may control an amount of the fuel supplied to the fuel cell unit 42 from the cartridge 40. If the cartridge 40 includes a compression element, the fuel actuator 46 may be a valve. However, if no compression element is included in the cartridge 40, the fuel actuator 46 can be a pump, to pump the fuel from the cartridge 40 to the fuel cell unit 42, or a combination of a pump and a valve. The fan 44 may be used to consistently control the temperature of the fuel cell unit 42. The fan 44 may be used to supply air to a cathode. The fan 44 may be an optional element. The circuit unit 48 controls the fuel actuator 46 and the fuel cell unit 42, so that an appropriate amount of fuel, according to the operation of the fuel cell unit 42, can be supplied to the fuel cell unit 42. If the fan 44 is provided, the circuit unit 48 may control the speed of the fan 44. If the output of the fuel cell is insufficient, the auxiliary power source 50 supplies power to the circuit unit 48, until the fuel cell system 100 generates a sufficient power output. The auxiliary power source 50 also supplies power to the fuel actuator 46, through the circuit unit 48.

Figure 3:
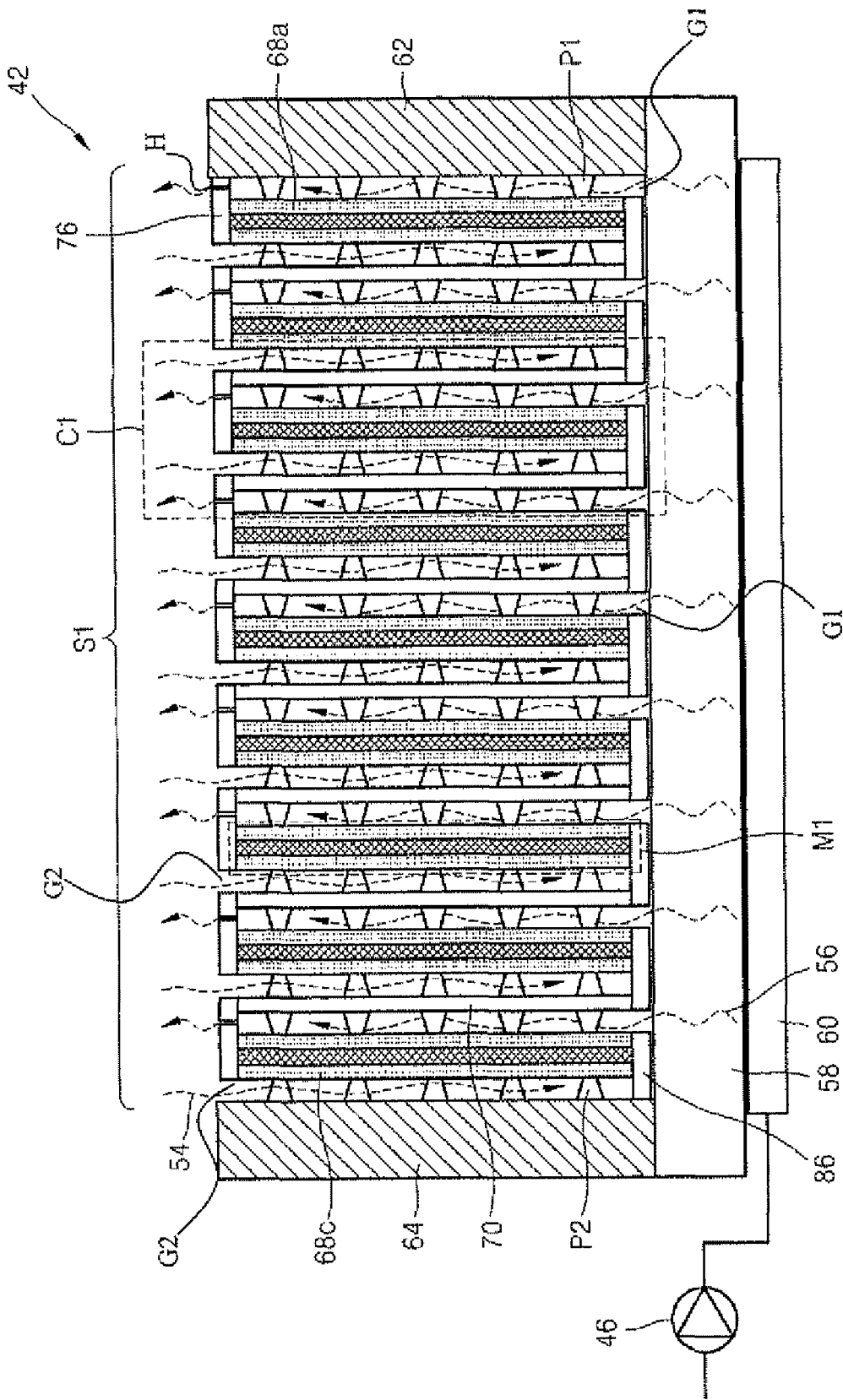
FIG. 3 is a cross-sectional view of an internal structure of portion A1 of FIG. 2.

FIG. 3 is a cross-sectional view showing an internal structure of the fuel cell unit 42. Referring to FIG. 3, the fuel cell unit 42 includes a stack S1 (fuel cell stack) disposed between first and second walls 62 and 64. The stack S1 includes a plurality of unit cells C1. The first and second walls 62 and 64 may be formed of a material that does not readily react with oxygen, fuel, and/or water. The plural unit cells C1 are disposed in parallel to one and other, and parallel with the first and second walls 62 and 64. In other words, a length of the unit cells C1 is aligned parallel to a length of the first and second walls 62 and 64 and perpendicular to a length of a phase change layer 58. As shown, the walls 62 and 64 are substantially parallel. However, it is understood that the walls 62 and 64 may be non-parallel in other aspects of the present teachings.

The fuel cell unit 42 may comprise the phase change layer 58 disposed adjacent to a lower end thereof. As referred to herein, upper and lower are relative to the drawings, are used for ease of description, and do not restrict the configurations described herein to any particular orientation. The stack S1 and the first and second walls 62 and 64 may be formed on an upper surface of a phase change layer 58, in a perpendicular direction to the upper surface of the phase change layer 58. A fuel diffusion layer 60 may be formed under the phase change layer 58. The fuel diffusion layer 60 may be a material layer having capillarity or may have an internal structure in which a capillary action acts. For example, the fuel diffusion layer 60 may be a porous material layer, a wick plate, or a wick layer.

The fuel that reaches the fuel diffusion layer 60 from the fuel actuator 46 is uniformly distributed to the fuel diffusion layer 60, due to the capillary action of the fuel diffusion layer 60. Accordingly, the fuel is simultaneously supplied to the entire phase change layer 58, through the lower surface of the phase change layer 58. The lower surface of the phase change layer 58 contacts the fuel diffusion layer 60. The fuel supplied to the phase change layer 58 is changed into a gas, while passing through the phase change layer 58, and the gaseous fuel is then supplied to the stack S1. The phase change layer 58 may be omitted in favor of an empty space, or can be formed of a material such as a porous ceramic or a porous polymer resin.

Protrusions P1 and P2 respectively face a cathode 68c and an anode 68a and are formed on inner surfaces of the first and second walls 62 and 64. The protrusions P1 maintain a fuel gap G1 between the first wall 62 and the anode 68a, and the protrusions P2 maintain an air gap G2 between the second walls 64 and the cathode 68c. The protrusions P1 and P2 can collect current from the MEAs M1 in contact therewith. The protrusions P1 and P2 can, for example, collect the current when current collectors are not additionally included in MEAs M1. Ends of the protrusions P1 and P2 contact the cathode 68c and the anode 68a, respectively. The fuel gap G1 may have an opening at a lower end of the fuel cell unit 42, adjacent to the phase change layer 58 and is closed at an upper end of the fuel cell unit 42, by an upper cap 76. Accordingly, the fuel 56 enters through the opening in the fuel gap G1 between the first wall 62 and the anode 68a, from the phase change layer 58. The air gap G2 has an opening at an upper end of the fuel cell unit 42, and is closed at a lower end of the fuel cell unit 42, by a lower cap 86. Accordingly, air 54 enters through the opening in the air gap G2.

A plate (not shown) may be inserted between the first and second walls 62 and 64 and the protrusions P1 and P2. The plate may be formed of the same material as plates 70 (as will be described below) that are interposed between membrane electrode assemblies (MEAs) M1. The fan 44 in FIG. 2 may be located above the upper end of the fuel cell unit 42.

Figure 4:
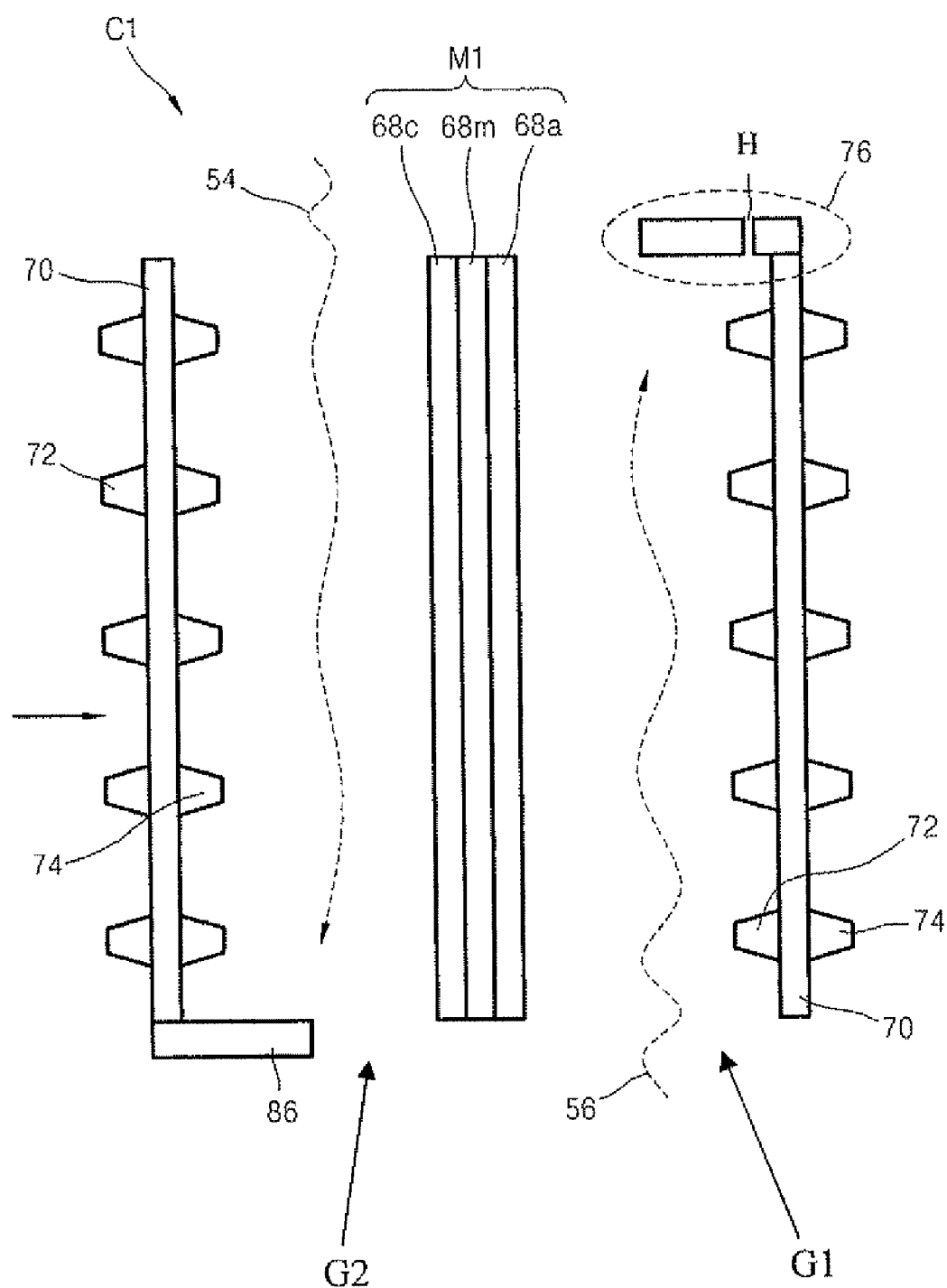
FIG. 4 is a cross-sectional view of elements that constitute a unit cell C1 of FIG. 3.

FIG. 4 is a cross-sectional view showing elements of the unit cells C1 that constitute the stack S1 of FIG. 3. Referring to FIGS. 3 and 4, the plates 70 are located on both left and right sides of the MEAs M1. The fuel cell unit 42 comprises first protrusions (spacers) 72 disposed on first surfaces of the plates 70, and second protrusions (spacers) 74 disposed on opposing second surfaces of the plates 70. The first and/or second protrusions 72 and 72 are spaced at predetermined intervals. The first and second protrusions 72 and 74 respectively contact the anodes and cathodes 68a and 68c of the MEAs M1. The first and second protrusions 72 and 74 may act as spacers that maintain the fuel gaps G1 and the air gaps G2, between the MEAs M1 and the plates 70, and may act as current collectors, if for example, additional current collectors are not included in the MEAs M1.

As referred to herein for convenience, each of the unit cells C1 may be said to include two of the plates 70, however, two adjacent unit cells C1 each include the plate 70 that is disposed therebetween. In other words each plate 70 can be said to be included in two different unit cells C1, which are adjacent to one another.

Figure 5:
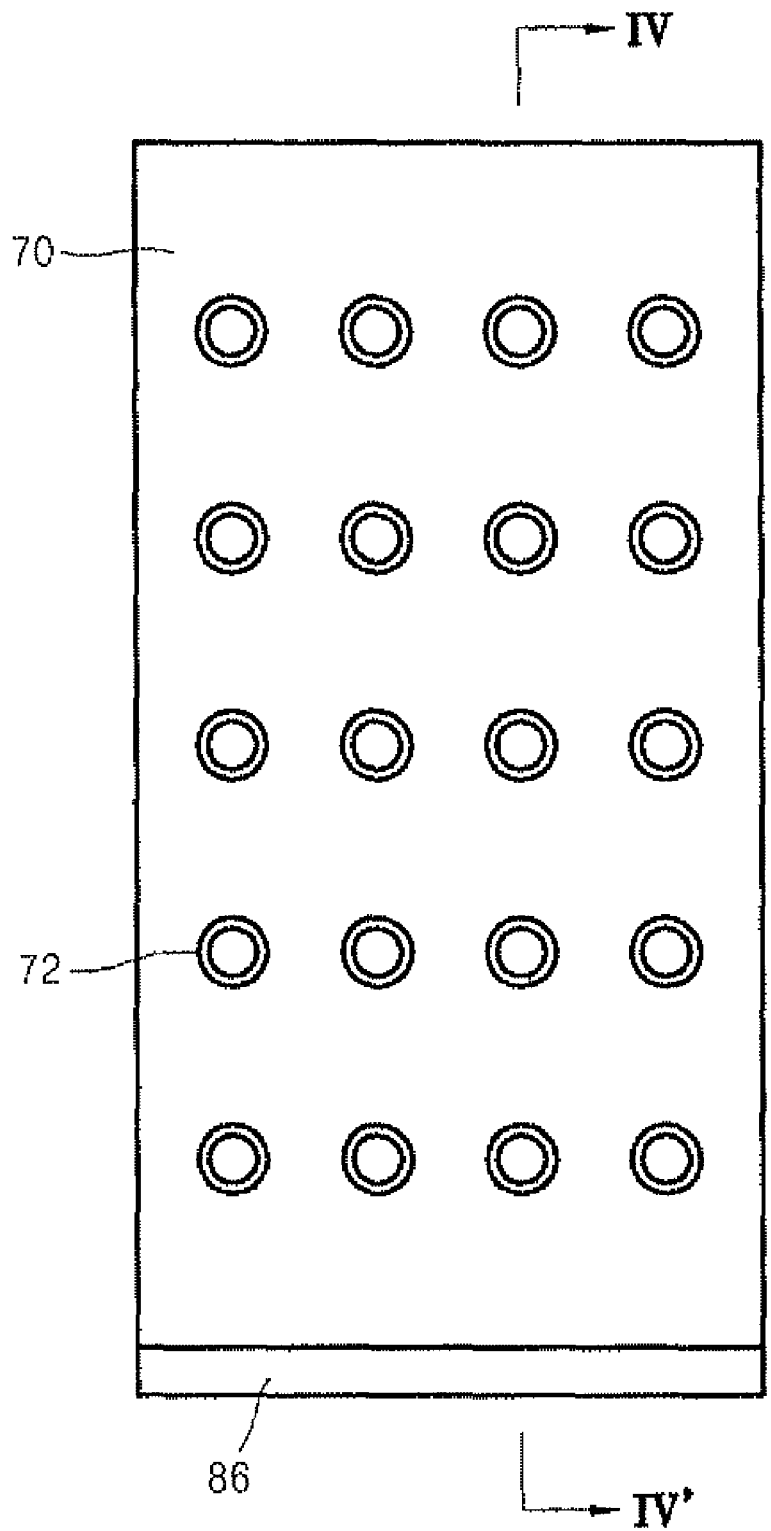
FIG. 5 is a front view of the unit cell C1, seen from a direction indicated by the arrow in FIG. 4.

The first and second protrusions 72 and 74 may be arranged at predetermined intervals, for example, as depicted in FIG. 5, in a lattice, however, the intervals may not equal to one another. The heights of the first and second protrusions 72 and 74 may be same, or the heights may be varied. Sizes, shapes, and heights of the first and second protrusions 72 and 74 may be different from one another. If the dimensions of the first and second protrusions 72 and 74 are changed, the amount of fuel or air entering between the MEA M1 and the plate 70 may vary. Therefore, the amount of fuel and air entering to the fuel cell unit 42 may be controlled by varying the dimensions of the first and second protrusions 72 and 74.

Referring again to FIGS. 3 and 4, upper caps 76, are disposed at the upper end of the fuel cell unit 42. The upper caps 76 extend from each of the plates 70, toward and covering respective adjacent ones of the MEAs M1, located to the left thereof. In this way, the fuel in the fuel gaps G1 is prevented from reaching the cathodes 68c. The upper caps 76 each include a hole H located above the fuel gaps G1. Accordingly, by-products produced during a reaction of the fuel 56 entering into the fuel gap G1 can be exhausted to the outside of the fuel cell unit 42, through the holes H. For example, if the fuel 56 is methane, $CO_2$ can be exhausted to the outside of the fuel cell unit 42 through the holes H. If a by-product is not produced during the reaction of the fuel 56, the holes H may be omitted. For example, if the fuel 56 is pure hydrogen, no by-product is produced. Accordingly, the holes H in the upper caps 76 may be omitted.

Lower caps 86 may be disposed at a lower end of the fuel cell unit 42. The lower caps 86 extend from each of the plates 70 toward and covering respective adjacent ones of the MEAs M1, located respectively to the right thereof. In this way, air in the air gaps G2 may be prevented from reaching the anodes 68a. The upper caps 76 and the lower caps 86 may separate the entering paths of the air 54 and the entering paths of the fuel 56, in the unit cells C1. In the unit cells C1, water is supplied to the anode 68a from the cathode 68c. The lower and upper caps 86 and 76 may be referred to as first and second caps, respectively.

In the unit cell C1 of FIG. 4, a lower end of the plate 70 located at the right side of the MEA M1 may be further separated from the MEA M1, so that the fuel gap G1, between the MEA M1 and the plate 70 is gradually reduced, as it goes towards the upper cap 76. In other words, the width of the fuel gap may be varied from the upper end, to the lower end of the fuel cell unit 42. In this case, the amount of fuel that reaches the upper cap 76 may be increased. Similarly, widths of the air gap G2, between the MEA M1 and the plate 70 located in the left side of the MEA M1, may be gradually reduced as a function of proximity to the lower cap 86. In this case, the amount of air that reaches the lower cap 86 may be increased. In other words, the air gap G2 has a first opening at a first end thereof, and a second opening at an opposing second end thereof, and width of the air gap G2 increases from the first opening to the second opening.

Instead of a liquid fuel such as methanol, a solid/liquid state fuel, such as, $NaBH_4$ that generates hydrogen by contacting a catalyst, may be used. The position of the anode 68a and the cathode 68c may be reversed in the MEA M1 of the unit cells C1. In such a configuration, the positions of the upper caps 76 and the lower caps 86 are also reversed. For example, the upper caps 76 may each cover the upper ends of the plates 70, the upper ends of the MEAs M1 located to the right thereof, and the upper openings of the air gaps G2 therebetween. The lower caps 86 may each cover the lower ends of the plates 70, the lower ends of the MEAs M1 located to the left thereof, and the lower openings of the fuel gaps G1 located therebetween.

For convenience of explanation, the upper and lower caps 76 and 86 are described. However, the positions and roles of the upper and lower caps 76 and 86 can be reversed, according to the locations of the anode and cathode 68a and 68c. That is, when assuming that reference numeral 76 is a first cap and numeral 86 is a second cap, one of the first and second caps 76 and 86 can be the upper cap and the other one can be the lower cap.

FIG. 5 is a front view (seen in a direction indicated by the arrow) of the unit cell C1, and FIG. 4 is a cross-sectional view taken along line IV-IV' of FIG. 5. The second protrusions 72 are shown as having a circular shape and are shown to be disposed in a grid.

While the aspects of the present invention have been particularly shown and described with reference to embodiments thereof, it should not be construed as being limited to the exemplary embodiments set forth herein Those who skilled in this art, for example, can modify the other constituent elements of the fuel cell system while maintaining the configuration of the fuel cell unit 42, according to the aspects of the present invention. Therefore, the scope of the invention is defined not by the detailed description of the invention but by the appended claims.

As described above, a fuel cell according to aspects of the present invention includes a fuel diffusion layer disposed upon a phase change layer and a stack disposed upon the phase change layer. A fuel diffuses through the fuel diffusion layer and is vaporized (converted to a gas), while passing through the phase change layer. The vaporized fuel (gas) enters into the stack. Accordingly, in the present invention, the concentration of the vaporized fuel supplied to the stack can be reduced to concentration levels found in conventional fuels using water diluted fuels.

As described above, in the fuel cell system according aspects of to the present invention, a fuel is supplied to the fuel cell as gas or vapor. Therefore, additional water for diluting the fuel is unnecessary. Accordingly, the fuel cell system, according to aspects of the present invention does not require a recycler, a heat exchanger, a heat dissipation fan, an air pump, and a feed pump, unlike conventional fuel cell systems. Thus, aspects of the present invention can simplify the configuration and operation of the fuel cell system, and can reduce power consumption and noise. Also, water required at an anode of a unit cell, can be supplied from a cathode. Therefore, the location of a water supply in the fuel cell system is not specifically limited. That is, water supplied to the anode can always be supplied regardless of the location of the fuel cell unit.

Configurations according to aspects of the present invention can result in a fuel cell system having a reduced volume, a reduced power consumption, and a reduced operating noise. The fuel cell system can supply water regardless of the position of the fuel cell unit.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A fuel cell system comprising:
    a fuel cell unit comprising:
        a stack comprising unit cells oriented substantially parallel to one another;

a phase change layer having a first surface disposed on a first side of the stack, having a length disposed substantially perpendicular to the parallel orientation of the unit cells, to convert a fuel into a gas, and to supply the gas to the unit cells; and
a fuel diffusion layer disposed upon a second surface of the phase change layer, to supply the fuel to the phase change layer;
a fuel cartridge to supply the fuel to the fuel cell unit; and
a fuel actuator to control an amount of the fuel that is supplied by the fuel cartridge to the fuel cell unit.

2. The fuel cell system of claim 1, wherein the fuel diffusion layer comprises a porous material, a wick plate, or a wick layer.

3. The fuel cell system of claim 1, wherein each of the unit cells comprises:
an MEA (membrane electrode assembly);
first and second plates that face each other, disposed adjacent to respective first and second sides of the MEA;
a first cap covering a first end of the MEA and a first end of the first plate; and
a second cap covering a second end of the MEA and a second end of the second plate,
wherein the first cap is disposed upon the phase change layer.

4. The fuel cell system of claim 3, wherein the second cap has a hole defined therein.

5. The fuel cell system of claim 3, wherein the unit cells comprises spacers to maintain gaps between the first and second plates and the MEAs.

6. The fuel cell system of claim 5, wherein the spacers are protrusions formed towards the MEA, on the first and second plates.

7. The fuel cell system of claim 1, further comprising a fan disposed adjacent to a second side of the stack, wherein the second side opposes the first side of the stack.

8. The fuel cell system of claim 1, wherein the fuel actuator is a valve and/or a pump.

9. A fuel cell system comprising:
a fuel cell stack comprising:
membrane electrode assemblies (MEAs);
plates disposed between each of the MEAs, substantially parallel to the MEAs, and separated from a first adjacent one of the MEAs by a fuel gap and a second adjacent one of the MEAs by an air gap;
first caps to cover first openings of the air gaps, first ends of the MEAs, and first ends of the plates, to prevent oxygen from reaching anodes of the MEAs;
second caps to cover second openings of the fuel gaps, second ends of the MEAs, and second ends of the plates, to prevent the gaseous fuel from reaching cathodes of the MEAs; and
a phase change layer disposed adjacent to the fuel cell stack, to convert a fuel into a gas, and to supply the gaseous fuel to the MEAs, via the fuel gaps.

10. The fuel cell system of claim 9, further comprising spacers disposed upon the plates, to maintain the fuel gaps and the air gaps.

11. The fuel system of claim 10, wherein the spacers are disposed on opposing first and second surfaces of the plates.

12. The fuel system of claim 9, wherein the second caps each have a hole defined therein, to allow byproducts of an electricity generation reaction to exit from the fuel gaps.

13. The fuel system of claim 9, further comprising:
end walls disposed adjacent to opposing ends of the fuel cell stack; and
spacers disposed on the end walls to maintain a space between the end walls and the MEAs respectively adjacent to the end walls.

14. The fuel cell system of claim 9, wherein:
the fuel gaps each have first openings disposed at a first end thereof, adjacent to the phase change layer, and
the gas supplied by the phase change layer to the MEAs passes through the openings.

15. The fuel cell system of claim 9, further comprising a diffusion layer disposed on a second surface of the phase change layer, to supply the fuel to the phase change layer.

16. The fuel cell system of claim 15, wherein the fuel diffusion layer comprises a porous material layer, a wick plate, or a wick layer.

17. The fuel cell system of claim 15, further comprising a fuel cartridge to supply the fuel to the diffusion layer.

18. The fuel cell system of claim 17, further comprising a fuel actuator to control an amount of the fuel supplied by the fuel cartridge to the diffusion layer.

19. The fuel cell system of claim 9, wherein the phase change layer comprises porous ceramic or a porous polymer resin.

20. The fuel cell system of claim 9, wherein the air gaps each have openings disposed at a second end thereof to allow for a flow of air into the air gaps.

21. The fuel system of claim 9, wherein:
the air gaps have second openings defined at second ends thereof; and
widths of the air gaps increase from the first openings of the air gaps to the second openings of the air gaps.

22. The fuel system of claim 9, wherein:
the fuel gaps have first openings defined at first ends thereof; and
widths of the fuel gaps decrease from the first openings of the fuel gaps to the second openings of the fuel gaps.

23. A unit cell of a fuel cell stack, comprising:
a membrane electrode assembly (MEA);
a first plate disposed substantially parallel and adjacent to a cathode of the MEA and spaced apart from the MEA by an air gap;
a second plate disposed substantially parallel and adjacent to an anode of the MEA and spaced apart from the MEA by a fuel gap; and
spacers disposed on first surfaces of the first and second plates to maintain the air gap and the fuel gap;
a first cap to cover a first opening of the air gap, a first end of the MEA, and a first end of the first plate, to prevent the gaseous fuel from reaching the cathode of the MEA; and
a second cap to cover a second opening of the fuel gap, a second end of the MEA, and a second end of the second plate, to prevent the oxygen from reaching the anode of the MEA
wherein the air gap channels oxygen to the cathode and the fuel gap channels a gaseous fuel to the anode.

24. The unit cell of claim 23, further comprising second spacers disposed on second surfaces of the first and second plates, to maintain a second fuel gap adjacent to the second surface of the first plate and a second air gap adjacent to the second surface of the second plate.

25. The unit cell of claim 23, wherein the second cap has a hole defined therein to allow byproducts of an electricity generation reaction to exit from the fuel gap.

* * * * *